May 17, 1955
T. E. CONERS
2,708,334
ROTARY POWER MOWER DISCHARGE PORT
Filed Oct. 22, 1953
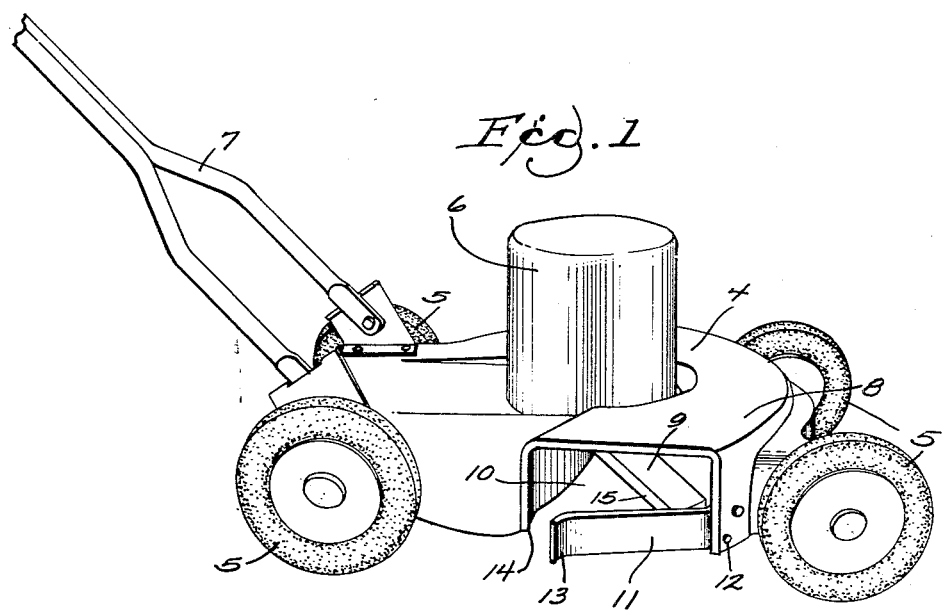
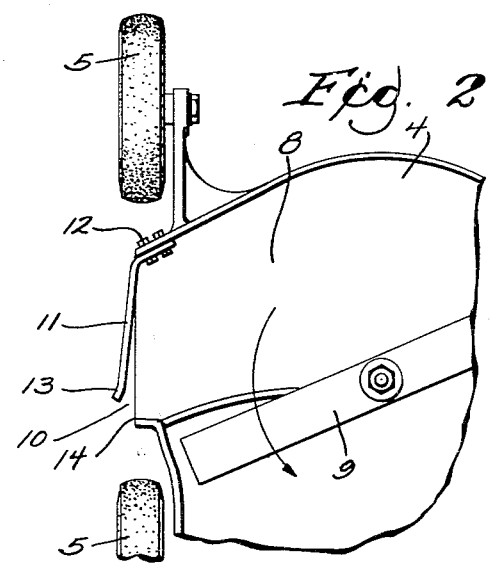
INVENTOR.
THOMAS E. CONERS
BY
Wheeler, Wheeler & Wheeler
ATTORNEYS

United States Patent Office 2,708,334
Patented May 17, 1955

2,708,334

ROTARY POWER MOWER DISCHARGE PORT

Thomas E. Coners, Lamar, Mo., assignor, by mesne assignments, to Outboard, Marine & Manufacturing Company, Waukegan, Ill., a corporation of Delaware Application October 22, 1953, Serial No. 387,690

5 Claims. (Cl. 56—25.4)

This invention relates to a rotary mower discharge port guard.

A rotary mower may have transversely of its forward housing end an inverted channel opening laterally to a discharge port toward which the blades sweep as they cut grass in the advance of the mower. In order that this port may properly discharge its function, it must be open for the discharge of the clippings and/or exhaust gas from the engine (if an engine is used as a motor).

Any guard at this point tends to obstruct discharge of clippings, since the grass, particularly when wet, tends to adhere to or bang across a guard. After many attempts to solve this problem, I have found that the guard will function satisfactorily in all respects and without stoppages if it comprises a fairly broad strap at the level of the blade and free at the end toward which the blade moves, the free end being somewhat spaced from the rear wall of the discharge port so that grass thrown against the guard by the rotary blade will tend to sweep longitudinally of the guard to a point of discharge from the end of the guard as hereinafter disclosed.

In the drawings:

Fig. 1 is a view in perspective of a mower embodying my invention.

Fig. 2 is an enlarged fragmentary detailed view in inverted plan of the portion of the mower housing to which the guard is applied.

Since the invention is not at all concerned with details of the housing 4, the wheels 5, the motor 6, or the handle 7, these parts have been illustrated without detail. The housing is preferably of a form in which there is an inverted channel at 8, disposed transversely of housing 4, so that grass clipped in the lateral sweep of the blades 9 during the advance of the housing (toward the right as viewed in Fig. 1) will lift the clippings and project them in one and the same movement through the discharge port 10. Inverted channel 8 upwardly deepens toward discharge port 10. It will be understood that the blade, rotating clockwise as viewed in Fig. 1 and counterclockwise, as viewed in Fig. 2, will sweep toward the discharge port 10 across the front of the housing and then across the discharge port and rearwardly as indicated by the arrow in Fig. 2.

The guard 11 comprises a strap which is desirably broad and flat to have greater width than the average grass clipping, is bolted or otherwise fastened at 12 to the housing at the forward side of the opening, and extends rearwardly across the opening. It may be inclined slightly outwardly with respect to the mouth of the opening and it may optionally terminate in a slight outward curve at 13 for the better release of grass clippings which may be sliding along the guard to the point of discharge. The free end portion 13 of the guard is spaced from the rear wall 14 of the opening. The guard tends to be kept clean because the blade tends to sweep the grass clippings lengthwise of the guard toward its free end with considerable velocity.

A guard as herein disclosed has proved very successful in overcoming difficulties encountered with many other types of guards in which there has been a tendency of the grass clippings to lodge on the guards. I attribute this success to the fact that the guard has a free end toward which the grass clippings are propelled and which desirably projects slightly and is, in any event, somewhat spaced from the rear wall of the discharge port.

As explained in my companion application, a large percentage of the grass clippings are lifted somewhat by the bevelled cutting edge 15 of the blade so that these pass over the guard at the top of the inverted channel 8. The guard itself is, however, located at the level of the plane in which the blade rotates so as to lie directly in the path upon which any part of the body could be inserted into the port 10 toward a position to be struck by the blade.

While reference has been made herein to the anchoring of the guard only at its forward end, it will be understood that this assumes the preferred construction in which the discharge port is near the forward end of the mower. If the port were otherwise located, the guard would be correspondingly situated to be free at the end toward which the blade moves and to be anchored at the end from which the blade comes.

Apart from the preferred guard construction in which the guard has a free end, there are believed to be significant advantages in the combination of a housing with an inverted channel and a guard which is located at the level of the blades with the rest of the channel discharge port open for the discharge of clippings over the guard.

I claim:

1. In a power mower of the rotary type having a housing provided with a lateral discharge opening for clippings and a blade rotatable across said opening, the combination with said housing of a guard having an end connected with the housing at the side of the opening from which the blade rotates and extending substantially across said opening and having an end adjacent the side of the opening toward which the blade rotates but spaced from said side for passage of clippings between said spaced end and side.

2. The device of claim 1 in which said guard comprises means of substantial vertical extent and disposed substantially in the plane of blade rotation.

3. The device of claim 1 in which the housing has an upwardly deepening inverted channel leading to said opening in the direction of blade movement and said guard spans the lower portion of the opening in substantially the plane of blade rotation, leaving the upper portion of said opening free for discharge of clippings over the guard.

4. The device of claim 1 in which said housing has front and rear walls and a top wall defining the opening, the guard being outwardly divergent from the path of the blade toward the spaced end of the guard.

5. The device of claim 4 in which the spaced end of the guard has increased outward divergence from such path.

References Cited in the file of this patent

UNITED STATES PATENTS

| | | |
|---|---|---|
| D. 168,064 | Morris et al. | Oct. 28, 1952 |
| 1,899,564 | Frey | Feb. 28, 1933 |
| 2,675,661 | Titzer | Apr. 20, 1954 |